(12) United States Patent
Moteki et al.

(10) Patent No.: US 8,034,510 B2
(45) Date of Patent: Oct. 11, 2011

(54) GAS DIFFUSION LAYER IN A FUEL CELL

(75) Inventors: Kazunari Moteki, Okazaki (JP); Keiji Hashimoto, Aichi-ken (JP)

(73) Assignees: Toyota Jidosha Kabushiki Kaisha, Toyota-shi, Aichi-ken (JP); Toyota Shatai Kabushiki Kaisha, Kariya-shi, Aichi-ken (JP)

( * ) Notice: Subject to any disclaimer, the term of this patent is extended or adjusted under 35 U.S.C. 154(b) by 354 days.

(21) Appl. No.: 12/441,579

(22) PCT Filed: Oct. 24, 2007

(86) PCT No.: PCT/IB2007/003181
§ 371 (c)(1),
(2), (4) Date: Mar. 17, 2009

(87) PCT Pub. No.: WO2008/050215
PCT Pub. Date: May 2, 2008

(65) Prior Publication Data
US 2009/0239120 A1 Sep. 24, 2009

(30) Foreign Application Priority Data
Oct. 25, 2006 (JP) .................................. 2006-290305

(51) Int. Cl.
*H01M 8/04* (2006.01)
(52) U.S. Cl. ........................................ 429/514; 429/512
(58) Field of Classification Search ........... 429/512–514
See application file for complete search history.

(56) References Cited

U.S. PATENT DOCUMENTS

| | | | | |
|---|---|---|---|---|
| 3,607,411 A | * | 9/1971 | Brownrigg | 429/242 |
| 6,296,964 B1 | * | 10/2001 | Ren et al. | 429/431 |
| 6,673,494 B2 | * | 1/2004 | West et al. | 429/233 |
| 6,682,843 B2 | * | 1/2004 | Speranza et al. | 429/446 |
| 2001/0008722 A1 | | 7/2001 | Speranza et al. | |
| 2003/0215695 A1 | * | 11/2003 | Suzuki et al. | 429/38 |
| 2004/0170882 A1 | * | 9/2004 | Ohara et al. | 429/35 |
| 2007/0231659 A1 | * | 10/2007 | Ma et al. | 429/35 |

FOREIGN PATENT DOCUMENTS

| | | |
|---|---|---|
| DE | 10 2004 016 494 A1 | 10/2005 |
| DE | 10 2005 018 056 A1 | 10/2006 |
| EP | 1 513 206 A3 | 3/2005 |
| EP | 1 537 923 A1 | 6/2005 |

(Continued)

*Primary Examiner* — Patrick Ryan
*Assistant Examiner* — Muhammad Siddiquee
(74) *Attorney, Agent, or Firm* — Finnegan, Henderson, Farabow, Garrett & Dunner, LLP

(57) ABSTRACT

A fuel cell includes a gas channel-forming member that forms a channel for supplying a reactant gas to a plane of an electrode. A basic structure of the gas channel-forming member is a corrugated plate portion in which ridge portions and trough portions continuously alternate with each other. In the gas channel-forming member, a plurality of corrugated plate portions are interconnected. Specifically, two adjacent corrugated plate portions are interconnected so that the trough portions of one of the two connect to the ridge portions of the other corrugated plate portion. The gas channel-forming member is disposed so that the direction of alignment of the connection planes S formed by the interconnection between the trough portions and the ridge portions is parallel to the plane of the electrode. This structure improves the diffusion efficiency of the reactant gas in the gas channel.

11 Claims, 13 Drawing Sheets

FOREIGN PATENT DOCUMENTS

| | | |
|---|---|---|
| JP | 8-138701 | 5/1996 |
| JP | 11-97039 | 4/1999 |
| JP | 2005-310633 | 11/2005 |
| JP | 2005-317322 | 11/2005 |
| JP | 2006-49072 | 2/2006 |
| JP | 2006-216424 | 8/2006 |
| JP | 2007-214020 | 8/2007 |
| WO | WO 2007/091718 A1 | 8/2007 |

* cited by examiner

GAS DIFFUSION LAYER IN A FUEL CELL

CROSS-REFERENCE TO RELATED APPLICATIONS

This application is a national phase application of International Application No. PCT/IB2007/003181, filed Oct. 24, 2007, and claims the priority of Japanese Application No. 2006-290305, filed Oct. 25, 2006, the contents of both of which are incorporated herein by reference.

BACKGROUND OF THE INVENTION

1. Field of the Invention

The invention relates to a fuel cell that has gas channel-forming members.

2. Description of the Related Art

In recent years, fuel cells that generate power through electrochemical reactions between a hydrogen gas and oxygen have been drawing attention as an energy source. A fuel battery has a structure that is formed by stacking a plurality of cells each of which is constructed by integrating a membrane-electrode assembly made up of an electrolyte membrane and electrode catalyst layers formed thereon, separators, and gas channels disposed between the membrane-electrode assembly and the separators. The gas channels feed the reactant gases that are used for electric power generation of the fuel battery, for example, a hydrogen gas, or an oxidizing gas, into the membrane-electrode assemblies.

Japanese Patent Application Publication No. 2005-310633 (JP-A-2005-310633) proposes a construction that employs an expanded metal, as a member for forming the gas channels. The expanded metal is a metal plate provided with regularly formed penetration holes of the same shape, and has been rolled into a flat platy shape.

However, in the foregoing related-art technology, although an expanded metal having many penetration holes is used, the channels are formed by streak-like recess portions that extend in a planar direction of the electrode catalyst layer, so that the directions of flow of the reactant gas are mostly in the planar direction of the electrode catalyst layer, and the reactant gas is unlikely to flow in a direction perpendicular to the plane (hereinafter, referred to as "the perpendicular-to-plane direction"). Therefore, there is a problem of the efficiency of the diffusion of the reactant gases in the gas channels cannot be sufficiently heightened.

Improvement in the gas diffusion layer is important from viewpoints of resolving the gas shortage on the electrode catalyst layer side, and is important from viewpoints of improving the drainage characteristic.

SUMMARY OF THE INVENTION

In view of the aforementioned circumstances, it is an object of the invention to provide a fuel cell intended to improve the diffusion efficiency of a reactant gas in a gas channel.

Accordingly, the fuel cell of the invention including an electrolyte layer, an electrode provided with a catalyst that is formed on the electrolyte layer, and a gas channel-forming member that is disposed at a side of the electrode and that forms a channel for supplying a reactant gas to a plane of the electrode is has a construction in which the gas channel-forming member is constructed so that a plurality of corrugated plate portions in each of which ridge portions and trough portions continuously alternate with each other in a first direction are interconnected in a second direction that intersects with the first direction and with a direction of an amplitude of the ridge portions and the trough portions, and so that two adjacent corrugated plate portions of the plurality of corrugated plate portions are interconnected in such a manner that the trough portions of one of the two corrugated plate portions connect to the ridge portions of another one of the corrugated plate portions and connection planes formed by interconnection between the trough portions and the ridge portions form stepped meshes, and in which a planar direction of each of the corrugated plate portions is inclined by a predetermined angle with respect to the plane of the electrode.

According to the fuel cell constructed as described above, the reactant gas is supplied to the plane of the electrode via the channels formed by the plurality of corrugated plate portions of the gas channel-forming member. In particular, since each of the corrugated plate portions is constructed so that its planar direction is inclined by a predetermined angle with respect to the plane of the electrode, the reactant gas flows along the surfaces of the corrugated plate portions, in directions that at least include a component of the direction perpendicular to the plane of the electrode. Besides, since the connection planes formed by the trough portions of one of two adjacent corrugated plate portions and the ridge portions of the other one of the corrugated plate portions form meshes (penetration holes) in the channel-forming member, the gas flow characteristic regarding the perpendicular-to-plane direction of the electrode can be heightened. On the other hand, the corrugated plate portion are constructed so that the ridge portions and the trough portions continuously alternate with each other, the reactant gas is also allowed to flow toward the trough portions, and the flow of the gas in a planar direction of the electrode will not be impeded. Therefore, since the reactant gas can be sufficiently fed in the perpendicular-to-plane direction with regard to the electrode in addition to the planar direction of the electrode, the diffusion efficiency of the reactant gas can be sufficiently heightened.

The connection planes in the gas channel-forming member may be inclined toward the electrode with respect to a flow direction of the reactant gas. According to this construction, since the efficiency in supplying the reactant gas toward the plane of the electrode can be particularly heightened, it becomes possible to actively introduce the reactant gas into the electrolyte layer-electrode assembly. Therefore, increased output of the fuel cell can be achieved.

Furthermore, the connection planes in the gas channel-forming member may be inclined away from the electrode with respect to a flow direction of the reactant gas. According to this construction, since the flow of the reactant gas away from the electrode can be increased, the discharge of the product water away from the electrode can be promoted by using the flow of the reactant gas. As a result, the degradation of the voltage stability due to flooding can be prevented.

The second direction may be a direction perpendicular to the first direction and to the direction of the amplitude of the ridge portions and the trough portions. Besides, lateral widths of the plurality of corrugated plate portions in the second direction may be equal to each other.

The gas channel-forming member is disposed in such a direction that a direction of alignment of the connection planes is parallel to the plane of the electrode. According to this construction, since the whole gas channel-forming member can be placed in parallel with the plane of the electrode, the disposing of the gas channel-forming member on the side of the electrode becomes easy. In particular, if in this construction, the corrugated plate portions have the same lateral width, the electrode-side edges of the connection planes are on a plane, so that the contact areas between the gas channel-forming member and the electrode can be increased. Hence, the contact resistance between the gas channel-forming member and the electrode can be reduced, and therefore heightened performance of the fuel cell can be achieved.

In the fuel cell constructed as described above, the meshes may have a hexagonal shape in a view in the second direction. Or, the meshes may have a quadrangular shape. According to this construction, the meshes, as penetration holes formed by the gas channel-forming member, have a so-called honeycomb shape or a shape similar to the honeycomb shape, in a view in the second direction. Hence, penetration holes with good regularity can be formed, and therefore the flow efficiency of the reactant gas can be enhanced.

The gas channel-forming member may be a member produced by forming cuts in a zigzag pattern in a metal sheet and expanding the cuts. According to this construction, the gas channel-forming member can be produced by a simple production method, that is, the production of the gas channel-forming member is easy.

The fuel cell constructed as described above may further include a separator, and the gas channel-forming member may be disposed between the electrode and the separator. The separator may be a three-layer stacked type separator formed by stacking three electroconductive plates that have electroconductivity.

According to the construction employing three-layer stacked type separators, there is no need to form gas channels on the separators, and the flow efficiency of the reactant gas can be improved. Besides, since the three-layer stacked type separator allows flat surfaces of the separator, the contact areas between the separator and the gas channel-forming member can be increased. Hence, the contact resistance between the separator and the electrode can be reduced, and therefore heightened performance of the fuel cell can be achieved.

The invention can be realized in various forms besides the foregoing forms. For example, the invention can also be realized in the form of a fuel cell system provided with the fuel cell of the invention, or the like.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which.

DETAILED DESCRIPTION OF THE EMBODIMENTS

In the following description and the accompanying drawings, the present invention will be described in more detail with reference to exemplary embodiments.

Figure 1:
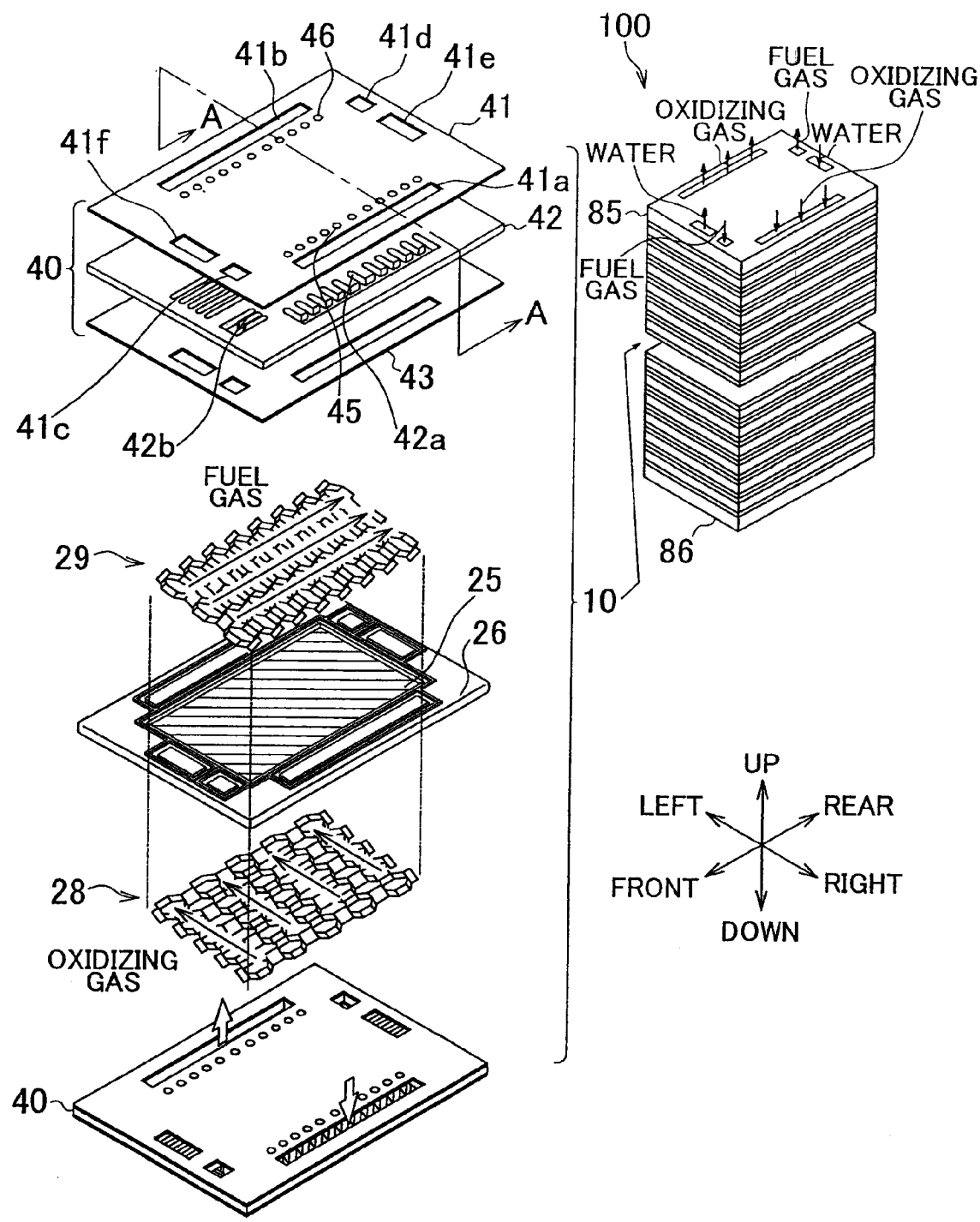
FIG. 1 is an illustrative diagram showing an overall construction of a fuel battery 100 of an embodiment of the invention.
Figure 2:
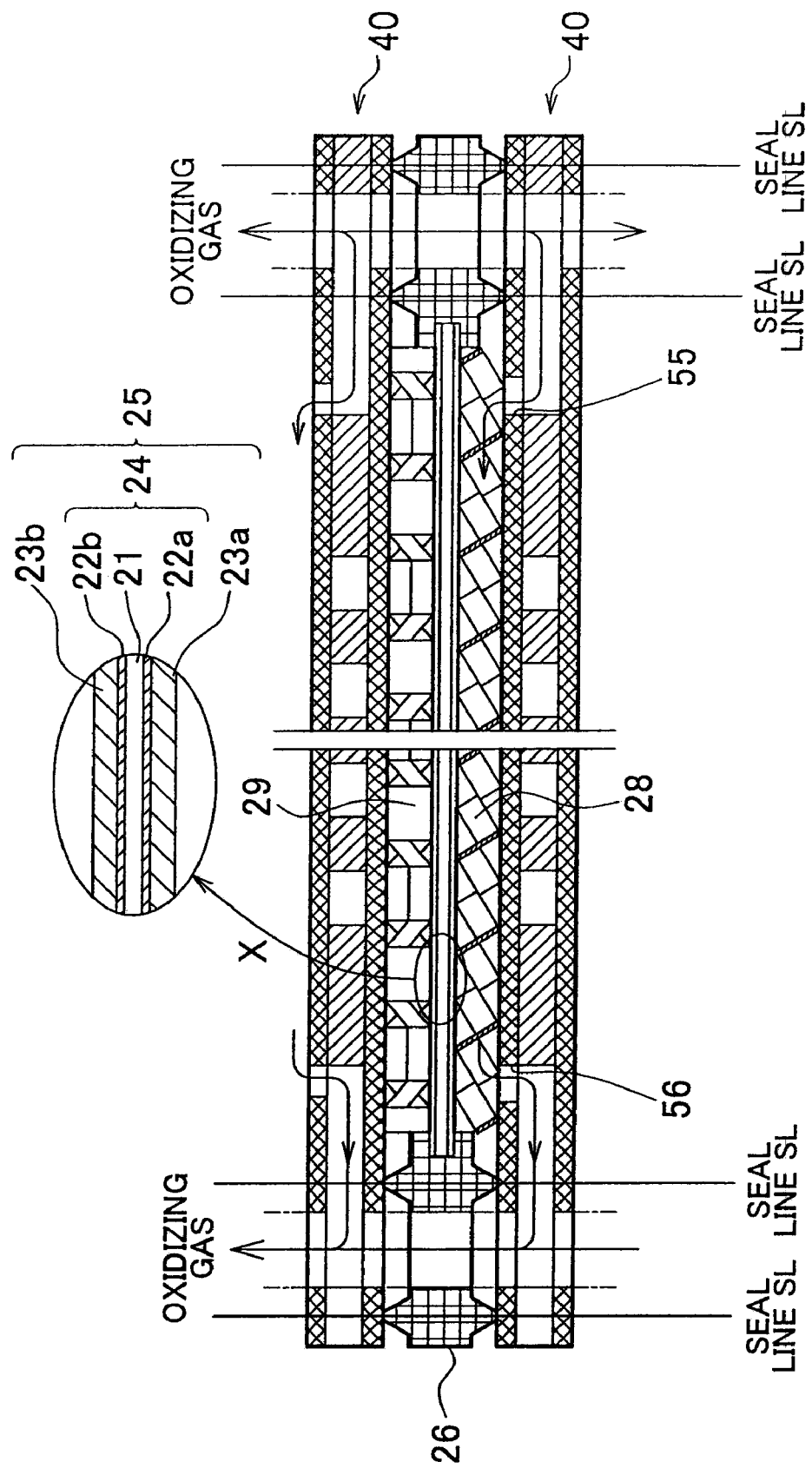
FIG. 2 is a sectional view of one of fuel battery cells 10 that constitute the fuel battery 100 taken on a plane A-A of FIG. 1.

Firstly, an overall construction of a fuel battery will be described. FIG. 1 is an illustrative diagram showing an overall construction of a fuel battery 100 in an embodiment of the invention. FIG. 2 is a sectional view of one of fuel battery cells 10 that constitute the fuel battery 100 taken on a plane A-A of FIG. 1. The fuel battery 100 of this embodiment is a solid polymer type fuel battery that is supplied with a fuel gas containing hydrogen and an oxidizing gas containing oxygen, and that generates electricity through electrochemical reactions between the fuel gas and the oxidizing gas (hereinafter, collectively referred to as "the reactant gases" when needed).

As shown in FIG. 1, in the fuel battery 100, a plurality of fuel battery cells 10 are stacked, and are clamped on both ends by end plates 85, 86. Each of the end plates 85, 86 has penetration holes for supplying or discharging the reactant gases and the like. Via these penetration holes, the reactant gases are smoothly supplied into the fuel battery 100 from an external hydrogen tank, a compressor, etc., (not shown).

As shown in FIG. 2, each fuel battery cell 10 includes an MEA (Membrane Electrode Assembly) 24, gas diffusion layers 23a, 23b, gas channels 28, 29, a seal gasket 26, and separators 40. The gas diffusion layers 23a, 23b are disposed on two opposite sides of the MEA 24. A member that is constructed of the MEA 24, the gas diffusion layer 23a and the gas diffusion layer 23b will be termed the MEGA 25. The gas channels 28, 29 are disposed between the MEGA 25 and the separators 40. The MEGA 25 and the gas channels 28, 29 are formed integrally with the seal gasket 26 so that an outer periphery of the MEGA 25 and the gas channels 28, 29 are surrounded by the seal gasket 26. The separators 40 are disposed on both sides of the integrated structure of the MEGA 25, the gas channels 28, 29 and the seal gasket 26.

The MEA 24 includes a cathode electrode catalyst layer 22a and an anode electrode catalyst layer 22b formed on surfaces of an electrolyte membrane 21. The electrolyte membrane 21 is a thin film of a solid polymer material that has proton conductivity and exhibits good electric conductivity in a wet condition. The electrolyte membrane 21 is formed in a rectangular shape that is smaller than the external shape of the separators 40 and larger than the external shape of the gas channels. The electrolyte membrane 21 is made of, for example, Nafion. The cathode electrode catalyst layer 22a and the anode electrode catalyst layer 22b formed on the surfaces of the electrolyte membrane 21 are loaded with a catalyst that accelerates the electrochemical reactions, for example, platinum. The cathode electrode catalyst layer 22a and the anode electrode catalyst layer 22b each correspond to an "electrode provided with a catalyst" in the invention.

Each of the gas diffusion layers 23a, 23b is a carbon-made porous body whose porosity is about 20%, and, for example, is formed from a carbon cloth, a carbon paper, etc. The gas diffusion layers 23a, 23b are integrated with the MEA 24 into the MEGA 25 by juncture. Incidentally, the gas diffusion layer 23a is disposed on the cathode side of the MEA 24, and the gas diffusion layer 23b is disposed on the anode side of the MEA 24. The gas diffusion layer 23a diffuses the cathode gas in directions of the thickness of the layer so as to supply the gas to the entire surface of the cathode electrode catalyst layer 22a. The gas diffusion layer 23b diffuses the anode gas in directions of the thickness of the layer so as to supply the gas to the entire surface of the anode electrode catalyst layer 22b. The gas diffusion layers 23a, 23b are provided mainly for the purpose of diffusing the gas in the directions of the thickness thereof, and therefore have a relatively small porosity.

The gas channels 28, 29 are each constructed of a channel-forming member produced by processing an electroconductive metal. The structure of the channel-forming member will be described in detail later. The gas channel 28 is disposed between the cathode side of the MEGA 25 (the cathode side of the MEA 24) and the separator 40. It is to be noted herein that the gas channel 28 includes many gas flow paths in this embodiment. The gas channel 29 is disposed on the anode side of the MEGA 25 (the anode side of the MEA 24) and the separator 40. It is also to be noted herein that the gas channel 29 includes many gas flow paths in this embodiment. The reactant gases flowing in the gas channels 28, 29 are supplied to the MEGA 25 while flowing in the channels, and are diffused to the cathode electrode catalyst layer 22a and the anode electrode catalyst layer 22b via the gas diffusion layers 23a, 23b of the MEGA 25, and are thus consumed by the electrochemical reactions.

The seal gasket 26 is made of an insulating resin material of a rubber having elasticity, such as silicone rubber, butyl rubber, fluororubber, etc. The seal gasket 26 is formed integrally with the MEGA 25 and the gas channels 28, 29 by the injection molding along the outer periphery of the MEGA 25 and the gas channels 28, 29. The seal gasket 26 is formed in a generally rectangular shape that is substantially as large as the separators 40. As shown in FIG. 1, penetration holes that form the manifolds of the reactant gases and the cooling water are formed along the four sides of the seal gasket 26. The manifold-forming penetration holes of the seal gasket 26 are the same as the penetration holes formed in the separators 40, and will be described later together with the structure of the separators 40.

Around the manifold-forming penetration holes, sites surrounding each penetration hole and protruded in the direction of the thickness of the seal gasket 26 are formed. The protruded sites substantially contact the separators 40 that sandwich the seal gasket 26, and collapse and deform upon receiving a predetermined fastening force in the stacking direction. As a result, the protruded sites form seal lines SL that restrain the leakage of fluid (hydrogen, oxygen, cooling water) that flows in the manifolds. The protruded sites become lip portions of the seal lines SL (see FIG. 2).

Next, the separators 40 that collect the electricity generated by the electrochemical reactions will be described. The separators 40 are three-layer stacked type separators formed by stacking three metal thin plates. Concretely, each separator 40 is constructed of a cathode plate 41 that contacts the gas channel 28 that is a channel for the oxidizing gas, an anode plate 43 that contacts the gas channel 29 that is a channel for the fuel gas, and an intermediate plate 42 that is sandwiched between the two plates and that forms a channel mainly for the cooling water.

The three plates of each separator 40 have smooth flat surfaces that face in the direction of the thickness of the separator 40 for forming channels (i.e., the contact surfaces thereof that contact the gas channels 28, 29 are flat), and are formed from an electroconductive metal material, such as stainless steel, titanium, a titanium alloy, etc.

The three plates have penetration holes that form the aforementioned various manifolds. Concretely, as shown in FIG. 1, long side portions of the generally rectangular separator 40 are provided with a penetration hole 41a for supplying the oxidizing gas, and a penetration hole 41b for discharging the oxidizing gas. Besides, short side portions of the separator 40 are provided with a penetration hole 41c for supplying the fuel gas, and a penetration hole 41d for discharging the fuel gas. The short side portions of the separator 40 also have a penetration hole 41e for supplying the cooling water, and a penetration hole 41f for discharging the cooling water, respectively.

Besides the penetration holes for the manifolds, the cathode plate 41 also has a plurality of hole portions 45, 46 that form the outlet and inlet openings of the gas channel 28 for the oxidizing gas. Similarly, the anode plate 43 also has a plurality of hole portions (not shown) that form the outlet and inlet openings of the gas channel 29 for the fuel gas, besides the aforementioned penetration holes for the manifolds.

Of the manifold-forming penetration holes formed in the intermediate plate 42, the manifold-forming penetration hole 42a through which the oxidizing gas flows is formed so as to communicate with the hole portions 45 of the cathode plate 41. Also, the manifold-forming penetration hole 42b through which the fuel gas flows is formed so as to communicate with the hole portions (not shown) of the anode plate 43. Incidentally, the intermediate plate 42 has a plurality of cutouts that extend in the direction of the long sides of the generally rectangular external shape of the intermediate plate 42. Two ends of each cutout communicate with the penetration holes that form the manifolds through which the cooling water flows.

By stacking and joining the three plates structured as described above, the channels for the various fluids are formed inside the separator 40.

As shown in FIG. 2, a part of the oxidizing gas that flows in the manifold formed by stacking the separator 40 and the seal gasket 26 passes via an interior of the separator 40 (a portion of the intermediate plate 42) and is supplied into the gas channel 28 through hole portions 55 of the separator 40. Then, the oxidizing gas having been consumed by the reaction or the oxidizing gas not having been consumed by the reaction flows through the gas channel 28 from the right to the left in the drawing of FIG. 2, and flows through holes 56 into the manifold via an interior of the separator 40. Incidentally, in FIG. 1, too, the oxidizing gas flows through the gas channel 28 from the right to the left as shown by arrows. Although the flow of the fuel gas will not be described, the flow of the fuel gas is substantially the same as the flow of the oxidizing gas. In FIG. 1, the fuel gas flows through the gas channel 29 from the front to the rear as shown by arrows.

Next, the construction of the gas channel-forming members will be described. Gas channel-forming members that construct the gas channels 28, 29 will be described. Since the gas channel-forming members for the gas channel 28 of the oxidizing gas and the gas channel 29 of the fuel gas have substantially the same constructions, a gas channel-forming member for the gas channel 28 of the oxidizing gas will be described.

Figure 3:
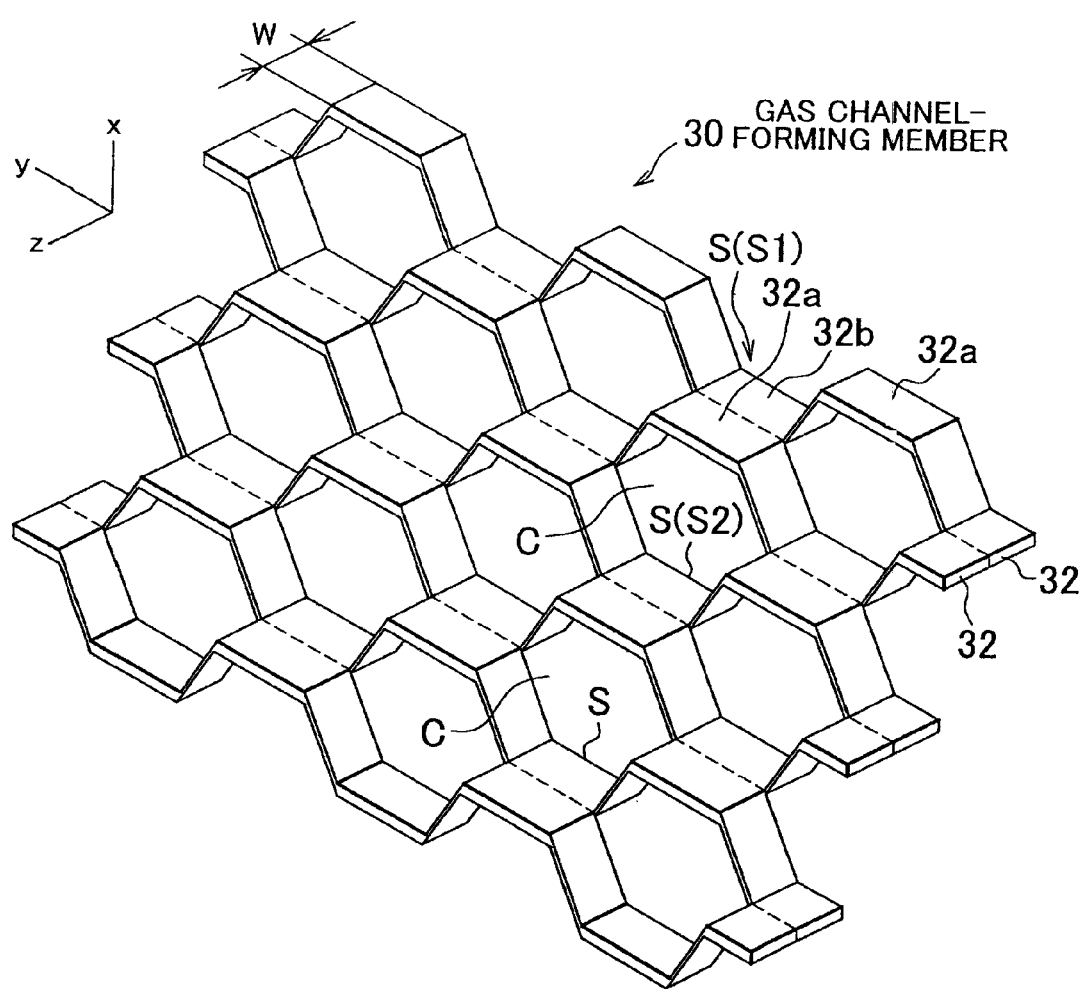
FIG. 3 is a perspective view showing a gas channel-forming member 30 in this embodiment.
Figure 4:
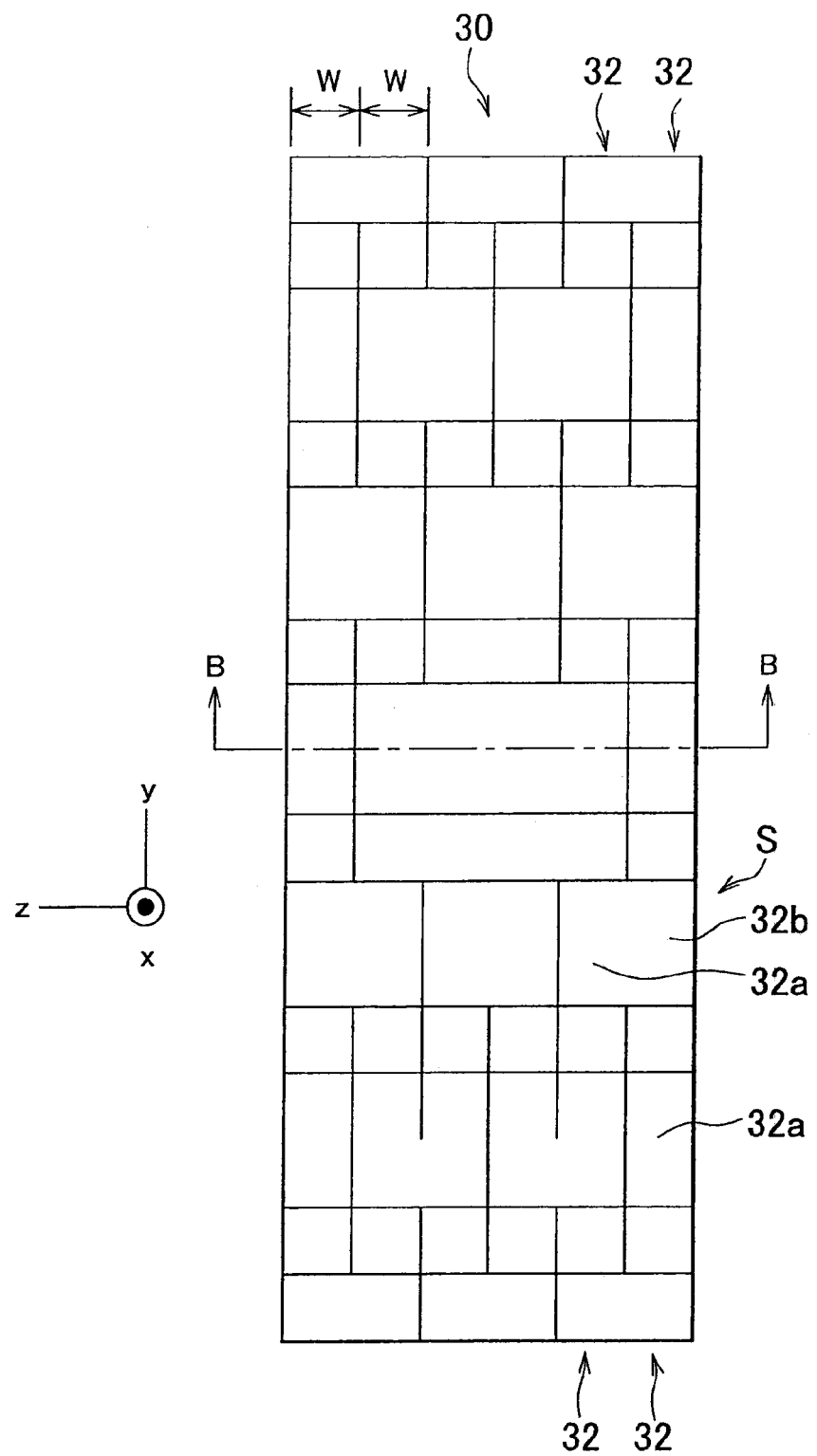
FIG. 4 is a plan view of the gas channel-forming member 30.
Figure 5:
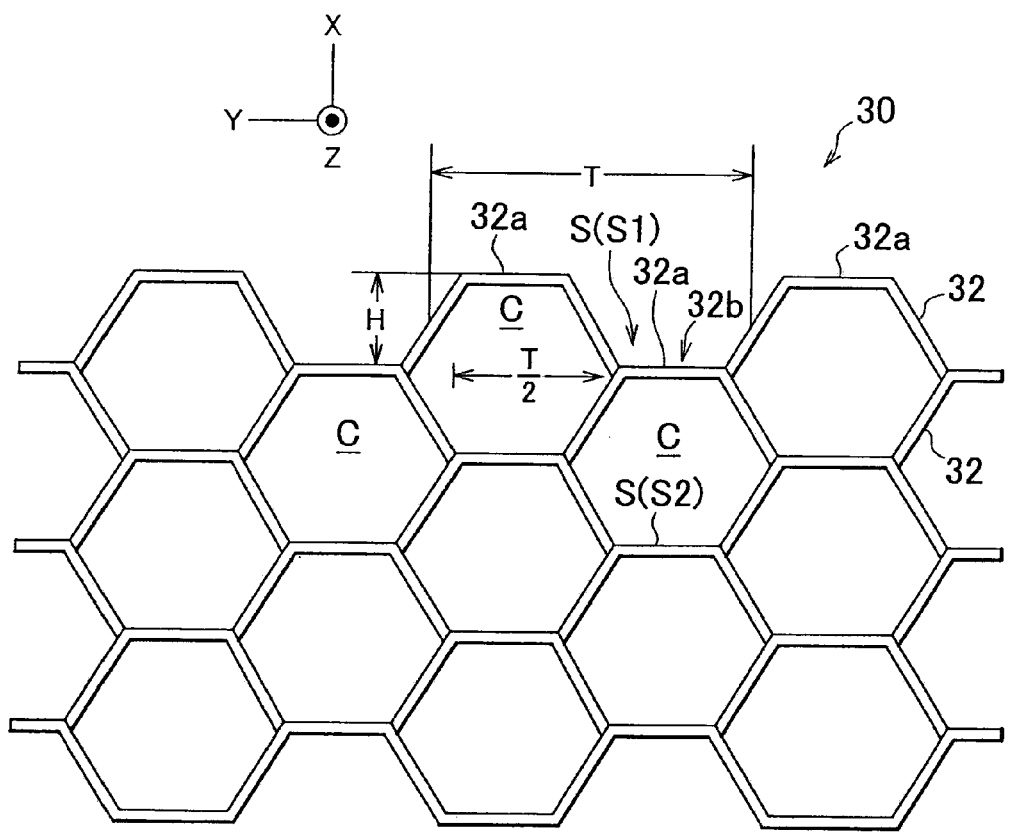
FIG. 5 is a front view of the gas channel-forming member 30.
Figure 6:
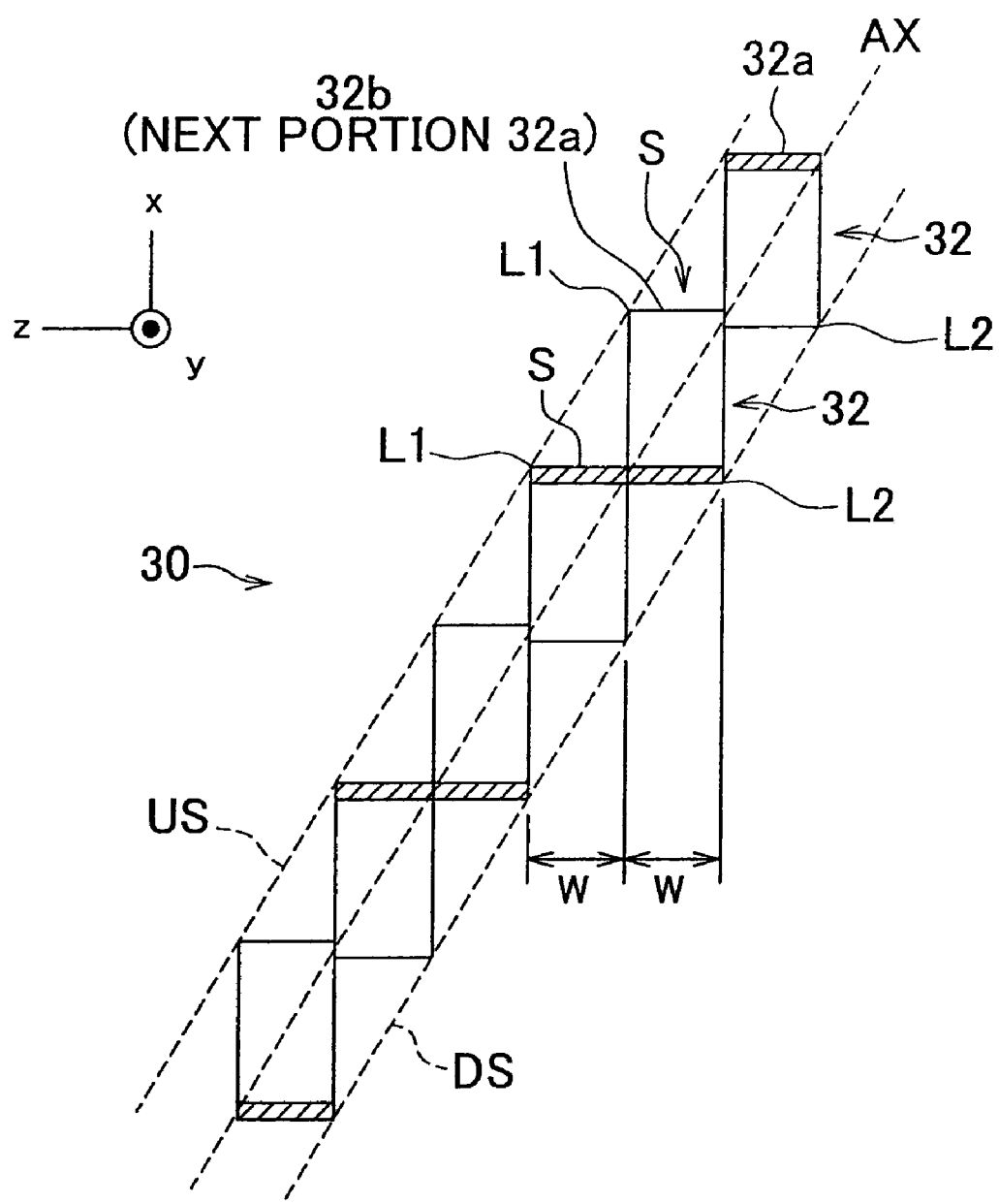
FIG. 6 is a sectional view of the gas channel-forming member 30 taken on a plane B-B of FIG. 4.

FIG. 3 is a perspective view showing a gas channel-forming member 30 in this embodiment. FIG. 4 is a plan view of the gas channel-forming member 30, and FIG. 5 is a front view of the gas channel-forming member 30. FIG. 6 is a sectional view of the gas channel-forming member 30 taken on the plane B-B of FIG. 4. As shown in these drawings, a basic structure of the gas channel-forming member 30 is a corrugated plate portion 32 in which ridge portions 32a and trough portions 32b continuously alternate with each other. The gas channel-forming member 30 has a construction in which a plurality of corrugated plate portions 32 are interconnected. The corrugated plate portions 32 have the same shape and also have the same lateral width W. Incidentally, the ridge portions 32a and the trough portions 32b have a shape in which the opening is larger in size than the top side (bottom side), that is, a shape in which the flanking sides are inclined to the perpendicular direction.

Dashed lines in FIG. 3 are provided for conveniently showing division between two adjacent corrugated plate portions 32. In FIGS. 3 to 5, the number of corrugated plate portions 32 interconnected is six.

The interconnection of a plurality of corrugated plate portions 32 is as follows. Assuming that the direction of the amplitude of the ridge portions 32a and the trough portions 32b is the direction of an x-axis, and the direction of the extension of the ridge portions 32a and the trough portions 32b is the direction of a y-axis (perpendicular to the direction of the x-axis), corrugated plate portions 32 are sequentially connected along the direction of a z-axis perpendicular to the direction of the x-axis and to the direction of the y-axis. The interconnection between two adjacent corrugated plate portions 32 is made so that the trough portions 32b of one of the corrugated plate portions 32 connect to the ridge portions 32a of the other corrugated plate portion 32. In detail, the aforementioned one corrugated plate portion 32 is an inverse of the other corrugated plate portion 32 in terms of reverse and obverse so that the trough portions 32b are converted into the ridge portions 32a, and the ridge portions 32a are converted into the trough portions 32b. Then, the trough portions 32b of the one corrugated plate portion 32 are connected to the ridge portions 32a of the other.

As a result of the foregoing connection, when seen in a front view as shown in FIG. 5, two adjacent corrugated plate portion 32, 32 are in a positional relationship in which they are shifted from each other by half the cycle T of the ridge portions 32a and the trough portions 32b in the direction of the y-axis, and by the amplitude H of the ridge portions 32a and the trough portions 32b in the direction of the x-axis. The connection portions between the trough portions 32b of a corrugated plate portion 32 and the ridge portions 32a of an adjacent corrugated plate portion 32 form single planes (hereinafter, referred to as "the connection planes"). Therefore, as can be seen from the drawing, a hexagonal penetration hole C is formed between a connection plane S1 and an adjacent connection plane S2 formed by the next trough portion 32b and the next ridge portion 32a. Hexagonal penetration holes C are arrange in such a zigzag pattern as to form a so-called honeycomb shape. Incidentally, in this embodiment, the aforementioned hexagonal shape is an equilateral and equiangular hexagon having equal sides and equal angles of 120°. The length of each side of the hexagon is 0.26 mm. The lateral width w of each corrugated plate portion 32 is 0.3 mm. As a modification of this embodiment, the hexagonal shape may be of a hexagon other than the equilateral and equiangular hexagon.

In the illustration shown in FIGS. 3 to 6, the number of repetitions of the ridge portions 32a and the trough portions 32b (hereinafter, referred to simply as "the ridge-trough frequency") is three, and the number of corrugated plate portions 32 interconnected is six. Therefore, as shown in FIGS. 3 and 5, the number of hexagonal penetration holes C formed is 3+2+3+2+3=13. Incidentally, as for the gas channel-forming member 30 for the gas channel 28 of the oxidizing gas in this embodiment, the gas channel-forming member 30 in reality has a construction in which the ridge-trough frequency is about 350 and the number of corrugated plate portions 32 interconnected is about 250 and the number of hexagonal penetration holes C is about 87000.

Next, the disposing of gas channel-forming members will be described. The gas channel 28 constructed of the gas channel-forming member 30 constructed as described above is disposed between the cathode side of the MEGA 25 (the cathode side of the MEA 24) and the separator 40 (see FIGS. 1 and 2). The manner of disposing the gas channel 28 will next be described.

As shown in FIG. 6, in the gas channel-forming member 30 constructed as described above, the connection planes S formed by the trough portions 32b and the ridge portions 32a of adjacent corrugated plate portions 32 are aligned in one direction. The direction of the alignment is represented by the direction of a line that connects the center points of the connection planes S, and is shown in FIG. 6 as the direction of an AX axis. Since the corrugated plate portions 32 have the same lateral width W, sides L1 of the connection planes S in the direction of the z-axis (leftward ends in the drawing) are on a plane US parallel to the AX axis (hereinafter, termed the top plane US). The opposite sides L2 of the connection planes S (rightward ends in the drawing) are on a plane DS parallel to the AX axis (hereinafter, termed the bottom plane DS). That is, the top plane US and the bottom plane DS are parallel to each other.

Figure 7:
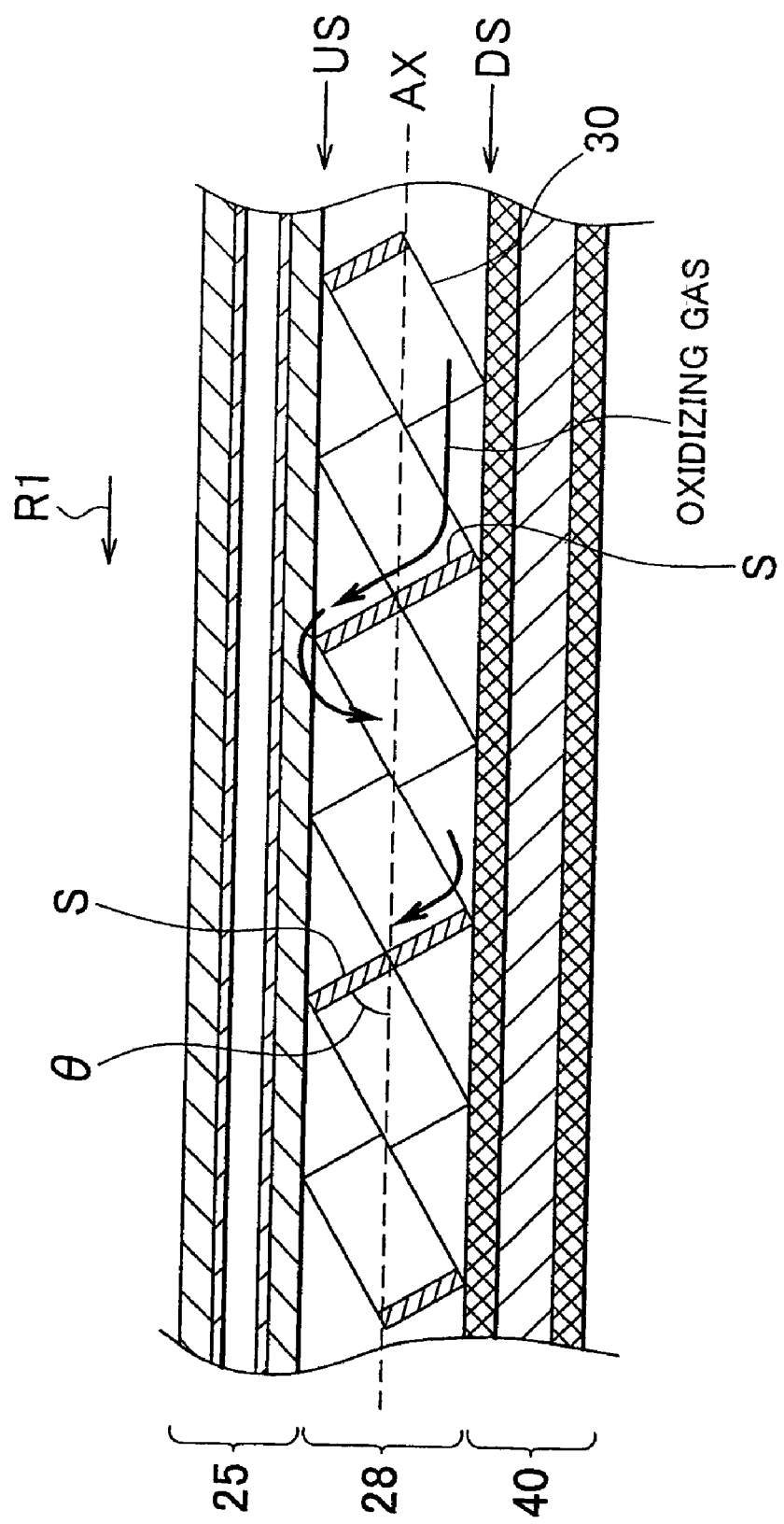
FIG. 7 is a sectional view of the gas channel-forming member 30 disposed between the cathode side of an MEGA 25 and a separator 40.

FIG. 7 is a sectional view of the gas channel-forming member 30 disposed between the cathode side of the MEGA 25 and the separator 40. As shown in FIG. 7, the gas channel-forming member 30 is disposed between the cathode side of the MEGA 25 and the separator 40 so that the top plane US of the gas channel-forming member 30 contacts the cathode-side surface of the MEGA 25, and the bottom plane DS of the gas channel-forming member 30 contacts the surface of the separator 40.

In other words, the gas channel-forming member 30 is disposed (stacked) between the cathode side of the MEGA 25 and the separator 40 so that the direction of the top plane US and the bottom plane DS is parallel to the cathode-side surface of the MEGA 25 (or the surface of the separator 40). Incidentally, since the top plane US and the bottom plane DS are parallel to the direction of the AX axis, which is the direction of the alignment of the connection planes S, it can also be said that the gas channel-forming member 30 is disposed between the cathode side of the MEGA 25 and the separator 40 so that the direction of the AX axis, which is the direction of the alignment of the connection planes S, is parallel to the cathode-side surface of the MEGA 25 (or the surface of the separator 40).

Incidentally, in FIG. 7, the direction of the overall flow of the oxidizing gas in the gas channel 28 is a direction from the right to the left as shown by an arrow R1 in the drawing, similarly to FIG. 2. On the other hand, the connection planes S formed in the gas channel-forming member 30 extend in such a direction as to intersect with the cathode-side surface of the MEGA 25. The straight line of the intersection between each connection plane S and the cathode-side surface of the MEGA 25 is in a direction orthogonal to the direction of the arrow R1. Specifically, the aforementioned straight lines of intersection are in a direction perpendicular to the sheet of the drawing. The connection planes S formed in the gas channel-forming member 30 are inclined clockwise from the direction of the arrow R1 by a predetermined angle θ (0°<θ<90°) about an axis extending in the direction of the aforementioned straight lines of intersection. In other words, the connection planes S are inclined toward the cathode side of the MEGA 25, with respect to the overall flow direction R1 of the oxidizing gas.

The value of the angle θ is determined from the H measurement of the equilateral and equiangular hexagon of the penetration holes C formed in the corrugated plate portion 32 (i.e., the distance of the descent of an upper blade after the upper blade contacts a sheet to be molded in a production method described below) and the lateral width W of the corrugated plate portion 32, and is +37° in this embodiment.

In the gas channel-forming member 30, the oxidizing gas flows along the surfaces of the connection planes S toward the cathode-side surface of the MEGA 25 as shown by thick arrowed lines. The amount of the oxidizing gas that has reached the cathode side of the MEGA 25 but has not been consumed by the reaction returns to the side of the gas channel 28 via the cathode-side gas diffusion layer 23a, and reaches the next connection plane S, and flows along the surface of the connection plane S toward the cathode-side surface of the MEGA 25.

Figure 8:
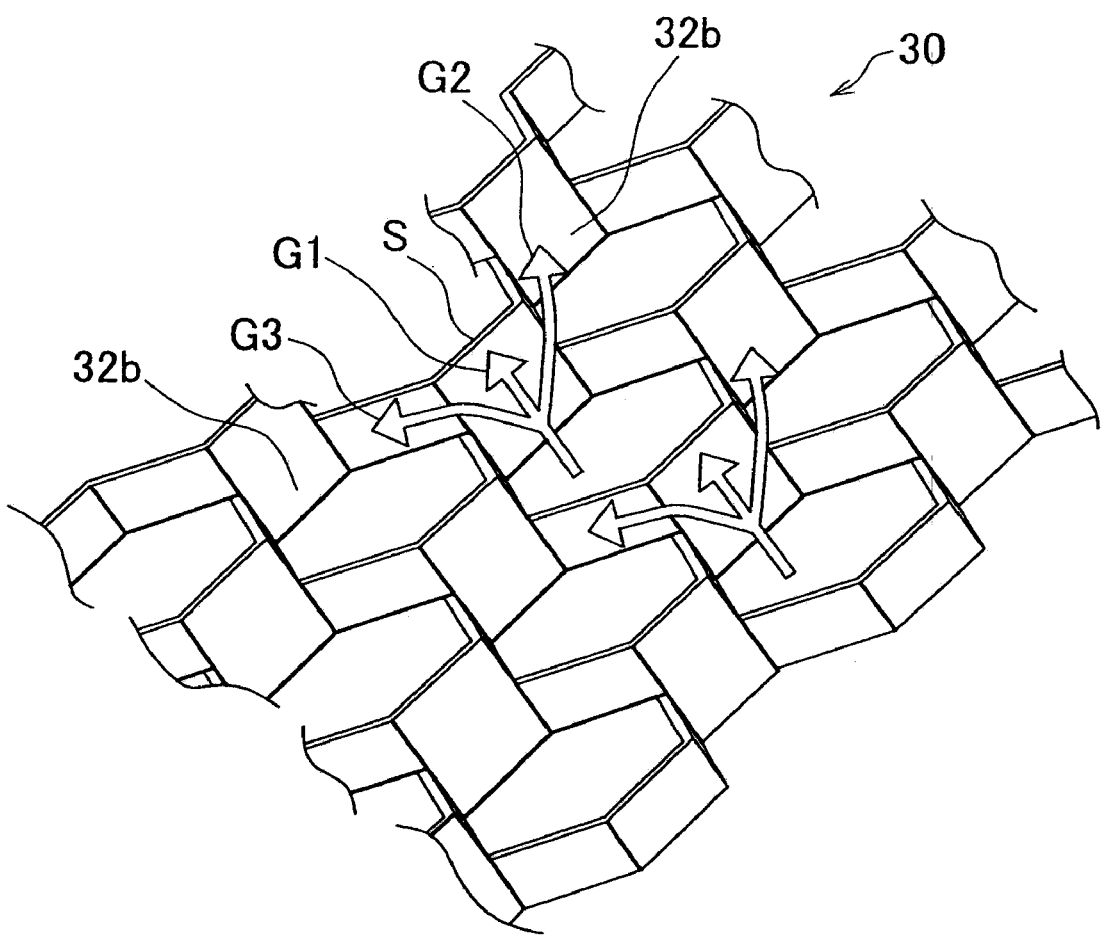
FIG. 8 is an illustrative diagram showing in detail the flow of gas along the surfaces of connection planes S.

FIG. 8 is an illustrative diagram showing the flow of the gas along the surfaces of the connection planes S in further detail. As shown in FIG. 8, the flow of the gas along the surface of the each connection plane S is not only a flow G1 toward the cathode-side surface of the MEGA 25, but the gas also flows in directions G2, G3 toward the two trough portions 32b adjacent to the connection plane S. Therefore, the oxidizing gas is allowed to flow toward the trough portions 32b as well, and the flow in a planar direction of the cathode of the MEGA 25 is not impeded. Thus, the oxidizing gas flows from the right to the left in FIG. 7 as a whole while diffusing upward in FIG. 7 toward the cathode-side gas diffusion layer 23a.

Next, the gas channel-forming member used for the gas channel 29 of the fuel gas will be described. The gas channel-forming member for the gas channel 29 of the fuel gas is different from the gas channel-forming member 30 for the gas channel 28 of the oxidizing gas merely in the longitudinal and lateral sizes, that is, the ridge-trough frequency of corrugated plate portions 32 and the number of corrugated plate portions 32 interconnected. The differences in the longitudinal and lateral sizes are attributed to the differences in the longitudinal and lateral sizes of the MEGA 25, and the basic construction of the gas channel-forming member for the gas channel 29 is the same as that of the gas channel-forming member 30 for the gas channel 28 of the oxidizing gas.

Figure 9:
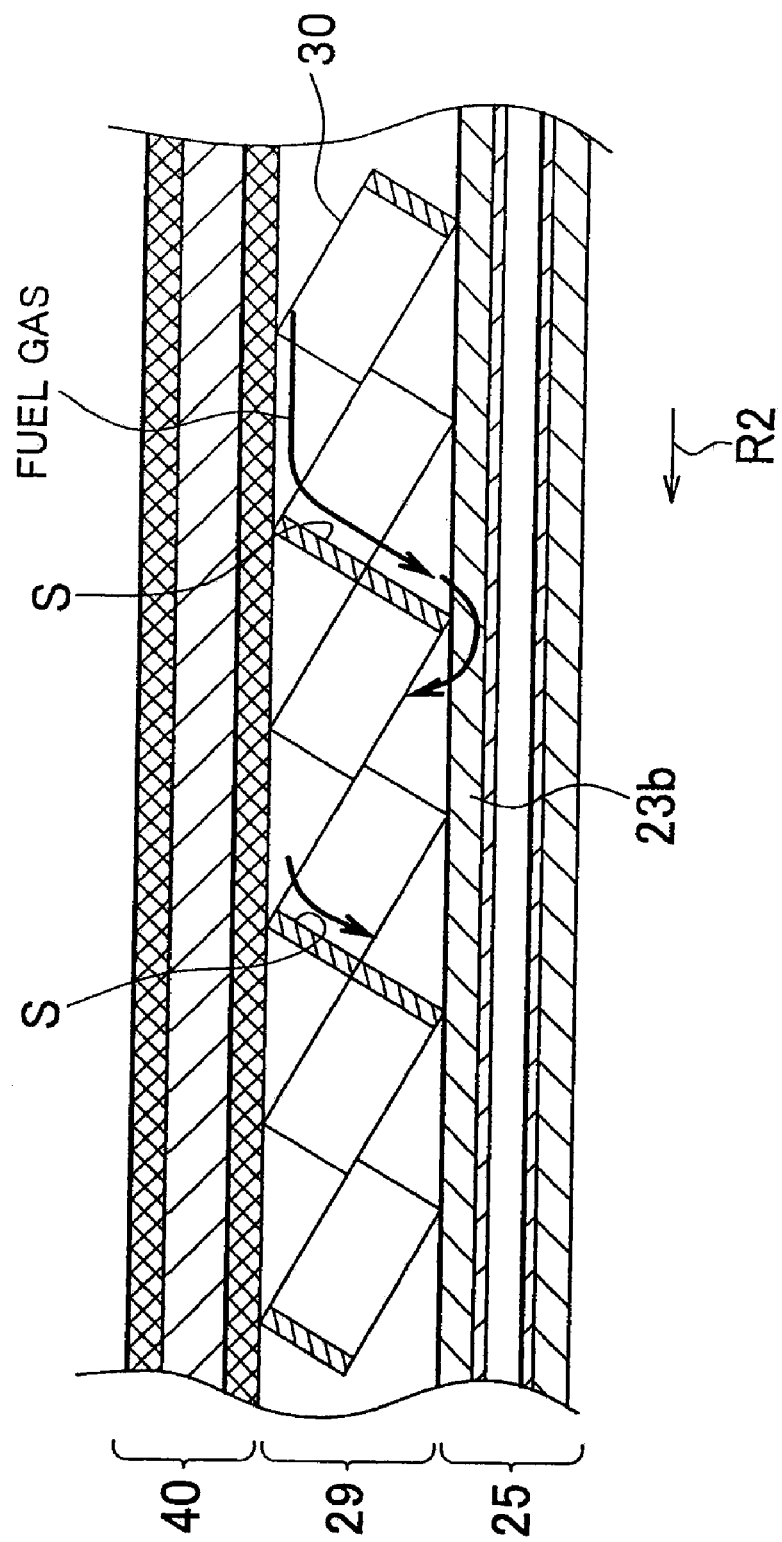
FIG. 9 is a sectional view of a gas channel-forming member 30' disposed between the anode side of the MEGA 25 and the separator 40.

FIG. 9 is a sectional view of a gas channel-forming member 30' for the gas channel 29 of the fuel gas disposed between the anode side of the MEGA 25 and the separator 40. As shown in FIG. 9, similar to the gas channel-forming member 30 for the gas channel 28 of the oxidizing gas, the gas channel-forming member 30' for the gas channel 29 is disposed between the anode side of the MEGA 25 and the separator 40 so that the top plane (or the bottom plane) of the gas channel-forming member 30' contacts the anode-side surface of the MEGA 25, and the bottom plane (or the top plane) of the gas channel-forming member 30' contacts the surface of the separator 40.

In FIG. 9, the overall flow direction in the gas channel 29 is a direction from the right to the left as shown by an arrow R2. The connection planes S formed in the gas channel-forming member 30', similar to those on the cathode side, are inclined toward the electrode (anode) of the MEGA 25 with respect to the overall flow direction R2 of the reactant gas (fuel gas). Therefore, the fuel gas flows along the surfaces of the connection planes S toward the anode-side surface of the MEGA 25 as shown by thick arrowed lines in FIG. 9. The amount of the fuel gas that has reached the anode side of the MEGA 25 but has not been consumed by the reaction returns to the side of the gas channel 29 via the anode-side gas diffusion layer 23b, and reaches the next connection plane S, and flows along the surface of the connection plane S toward the anode-side surface of the MEGA 25. Furthermore, similarly to the side of the gas channel 28 shown in FIG. 8, the fuel gas is also allowed to flow toward the trough portions 32b, and the flow of the gas in a planar direction of the anode of the MEGA 25 is not impeded. Thus, the fuel gas flows from the right to the left in FIG. 9 as a whole while diffusing downward in FIG. 9 toward the anode-side gas diffusion layer 23b.

Figure 10A:
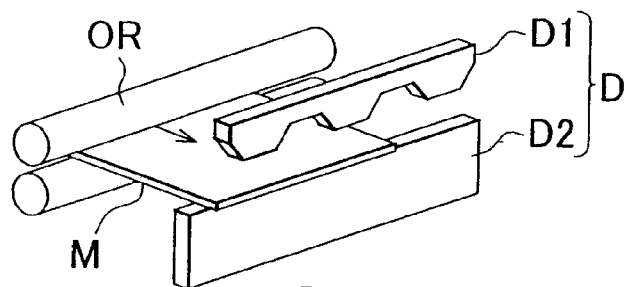
FIGS. 10A to 10F are illustrative diagrams showing a production method for the gas channel-forming member 30.
Figure 10B:
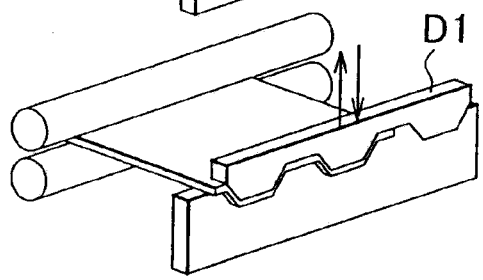
Figure 10C:
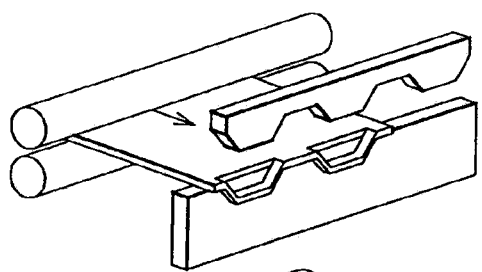

Next, a production method for the gas channel-forming member will be described. FIGS. 10A to 10F are illustrative diagrams showing a production method for the gas channel-forming member 30. As shown in FIG. 10A, a metrical M is first fed to a blade die D made up of an upper blade D1 and a lower blade D2 by feed rollers OR. The material M is a thin-walled metal sheet, and in detail, is a stainless steel sheet (e.g., a ferrite-based stainless steel sheet) whose sheet thickness is about 0.1 mm to 0.2 mm. Instead of the stainless steel sheet, a titanium or titanium-alloy sheet or the like may be used.

Figure 11:
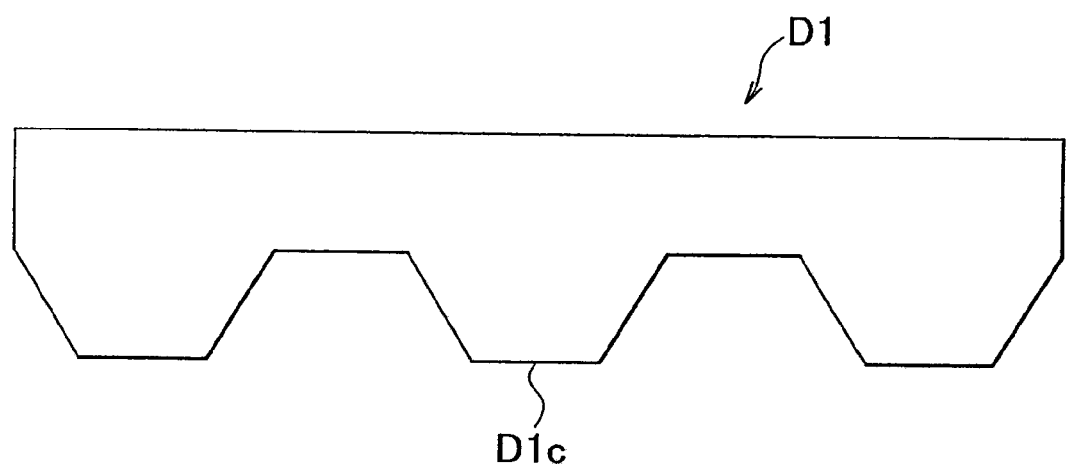
FIG. 11 is a front view of an upper blade D1.

FIG. 11 is a front view of the upper blade D1. As shown in FIG. 11, blade portions D1c of the upper blade D1 are formed in a ridge shape so as to sequentially form cutouts in a zigzag arrangement in the material M. A top portion of the ridge shape of each blade portion D1c is flat.

Figure 10D:
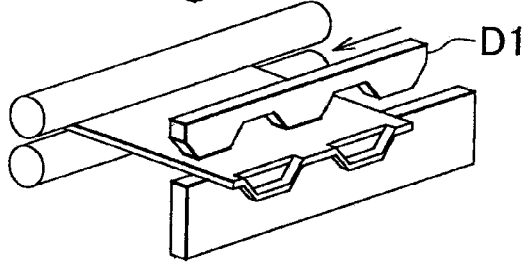

Referring back to FIGS. 10A to 10F, the upper blade D1 is lowered to a predetermined position, and then is raised as shown in FIG. 10B. Subsequently, the material M is fed a predetermined distance by the feed rollers OR. This predetermined distance equals the lateral width W of the corrugated plate portion 32. Subsequently, the upper blade D1 is moved in a lateral direction as shown in FIG. 10D. The distance of this movement equals a half the cycle T of the ridge portions 32a and the trough portions 32b of the corrugated plate portion 32.

Figure 10E:
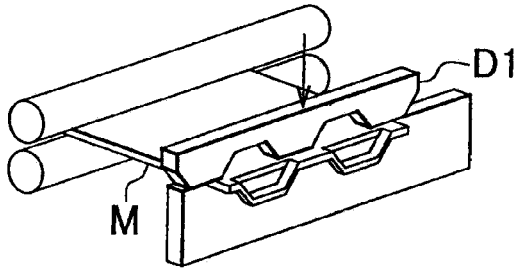
Figure 10F:
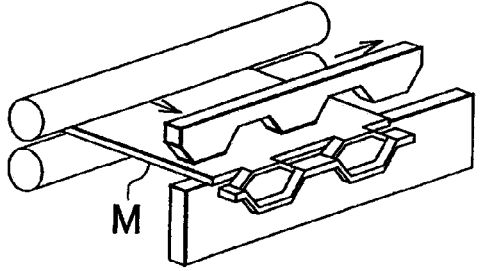

Subsequently, the upper blade D1 is lowered as shown in FIG. 10E. By this operation, linear cuts are formed in a zigzag pattern in the material M, and are expanded, so that stepped meshes are formed in the material M (see FIG. 10F). Subsequently, the upper blade D1 is returned, as shown in FIG. 10F, to the position assumed before it was moved as in FIG. 10D, and then the operation shown in FIGS. 10A to 10F is repeatedly executed.

The foregoing production method is similar to the production method for an expanded metal, and is different therefrom in the following respects. The expanded metal is a metal rolled into a flat sheet. That is, a stepped mesh pattern produced by a technique similar to that described above is subjected to flat rollers so that the strand portions and the bond portions come to be in the same plane. On the other hand, the production method for the gas channel-forming member 30 in this embodiment does not require the flat process that uses flat rollers. Furthermore, the upper blade used for producing the expanded metal has a triangular saw teeth-like shape while the upper blade D1 used in this embodiment has a shape of flat-top r66idges. Since flat portions are provided, a plane S can be formed as a connection between a ridge portion 32a and a trough portion 32b.

According to the foregoing fuel battery 100 of this embodiment, the reactant gas is supplied to the MEGA 25 via the gas channels 28, 29 formed by gas channel-forming members 30. In each gas channel-forming member 30, the connection planes S are formed by the connection between the trough portions 32b and the ridge portions 32a of a plurality of corrugated plate portions 32, and the connection planes S form stepped meshes. Each connection plane S is constructed so that its planar direction is inclined by a predetermined angle with respect to the electrode-side surface of the MEGA 25. Therefore, the reactant gas flows along the surface of each connection plane S toward the electrode-side surface of the MEGA 25. Besides, the reactant gas also moves toward the two flanking trough portions 32b of each connection plane S. That is, the reactant gas is allowed to flow toward the trough portions 32b as well, so that the flow of the gas in a planar direction of the electrode is not impeded. Therefore, since the reactant gas can be sufficiently fed in the perpendicular-to-plane direction with regard to the electrode in addition to the planar direction of the electrode, the diffusion efficiency of the reactant gas can be sufficiently heightened. In particular, in this embodiment, since the efficiency in supplying the reactant gas toward the plane of the electrode can be heightened, it becomes possible to actively introduce the reactant gas into the MEGA 25. Therefore, increased output of the fuel battery 100 can be achieved.

Furthermore, according to the fuel battery 100 of this embodiment, each gas channel-forming member 30 has a construction in which the direction of alignment of connection planes S is parallel to the plane of the electrode, and in which the corrugated plate portions 32 that form the connection planes S have the same shape. Therefore, the one-side edges of the connection planes S are contained in a plane, and the other-side (opposite-side) edges of the connection planes S are contained in another plane. This construction makes it possible to increase the contact areas between the gas channels 28, 29 constructed by the gas channel-forming members 30 and the electrodes and between the gas channels 28, 29 and the separators 40. Hence, the contact resistance between the gas channel-forming members 30 and the MEGAs 25 can be reduced, and therefore heightened performance of the fuel battery 100 can be achieved.

Furthermore, in this embodiment, since the three-layer stacked type separators 40 are used, there is no need to form gas channels 28, 29 on the separators 40, and the flow efficiency of the reactant gases can be improved. Besides, since the three-layer stacked type separator 40 allows the provision of flat surface of the separator, the contact areas between the separators 40 and the gas channel-forming members 30 can be increased.

According to the fuel battery 100 of this embodiment, the gas channel-forming member 30 is a member produced by forming linear cuts in a zigzag pattern in a metal sheet and simultaneously expanding the cuts. Thus, the gas channel-forming member 30 can be produced by a simple production method, that is, the production of the gas channel-forming member 30 is easy.

Other embodiments will be briefly described below. Incidentally, the invention is not limited to the foregoing embodiment or its modifications, but can also be embodied with various manners without departing from the gist of the invention. For example, the following modifications are possible.

Figure 12:
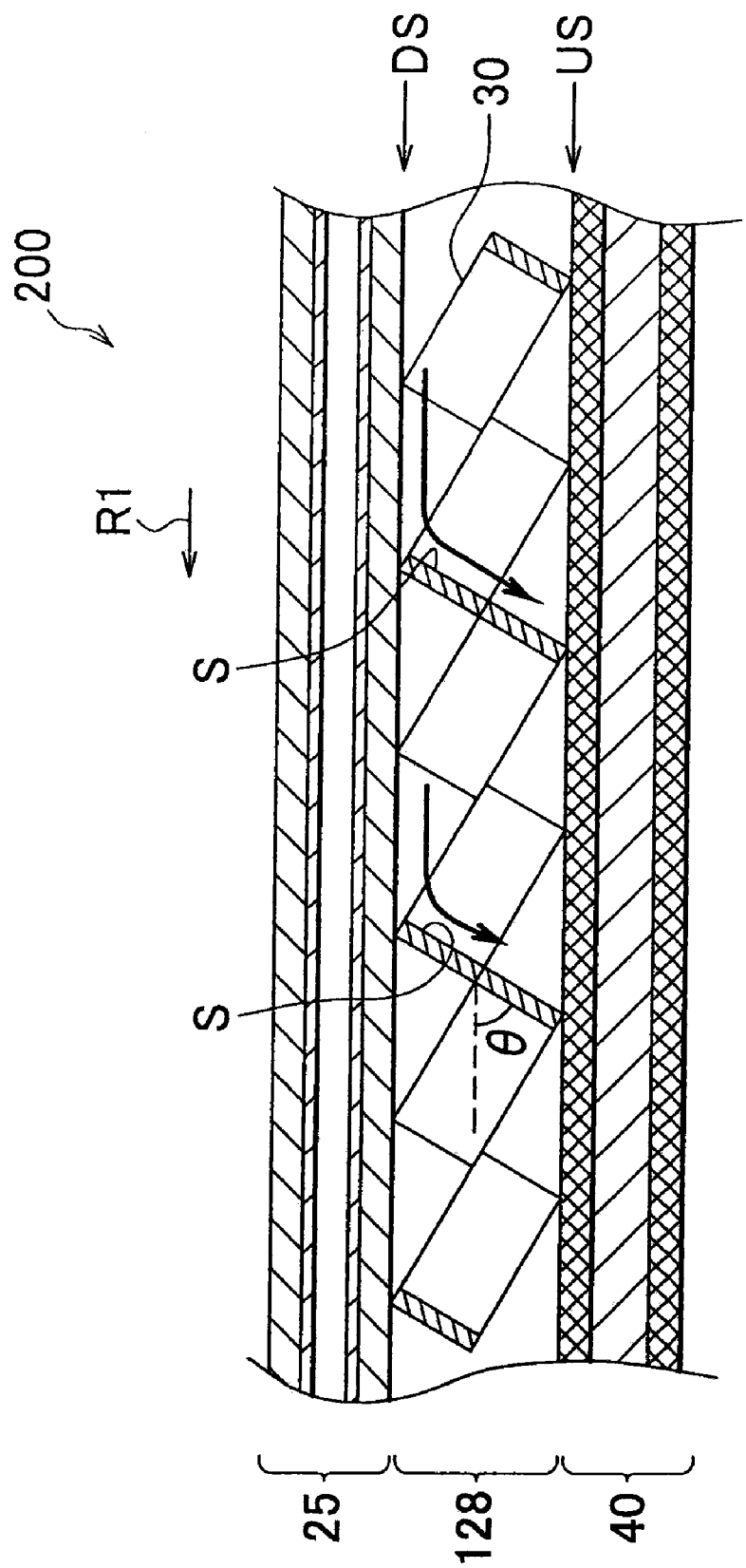
FIG. 12 is a sectional view of a gas channel 128 and its surroundings in a fuel battery 200 in accordance with a first modification of the embodiment of the invention.

A first modification will be described. FIG. 12 is a sectional view of a gas channel 128 and its surrounding in a fuel battery 200 in accordance with the first modification. The first modification is different from the foregoing embodiment merely in the construction of the gas channel 128, and the other constructions of the first modification are the same as those of the foregoing embodiment. The gas channel 128 is formed by substantially the same gas channel-forming member 30 as the gas channel 28 of the foregoing embodiment, but is different therefrom in the manner of disposing the gas channel-forming member 30. Specifically, the gas channel-forming member 30 of the first modification is disposed so that the top plane US and the bottom plane DS thereof are inverted, as compared with the gas channel 28 of the foregoing embodiment. That is, in the first modification, the bottom plane DS of the gas channel-forming member 30 contacts the cathode-side surface of the MEGA 25, and the top plane US of the gas channel-forming member 30 contacts the surface of the separator 40. As a result, the connection planes S formed in the gas channel-forming member 30 are inclined counterclockwise from the direction of the arrow R1 by a predetermined angle θ (0°<θ<90°) about an axis perpendicular to the sheet of the drawing. That is, the connection planes S are inclined toward the separator 40 with respect to the overall flow direction R1 of the oxidizing gas.

In the gas channel-forming member 30 disposed as described above, the oxidizing gas flows along the surfaces of the connection planes S toward the surface of the separator 40 as shown by thick arrowed lines in FIG. 12. As a result, the flow of the oxidizing gas away from the electrode of the MEGA 25 is increased. Therefore, using the flow of the oxidizing gas, the discharge of the product water away from the electrode can be promoted. In consequence, the degradation of the voltage stability due to flooding can be prevented.

According to the foregoing fuel battery 200 of the first modification, the oxidizing gas can be sufficiently fed in the perpendicular-to-plane direction of the electrode in addition to the planar direction of the electrode, as in the foregoing embodiment. Therefore, the diffusion efficiency of the oxidizing gas can be sufficiently heightened. In particular, since the flow of the oxidizing gas away from the electrode can be increased, the discharge of the product water away from the electrode can be promoted by using the flow of the oxidizing gas.

Although the first modification is applied to the gas channel 28 on the cathode side of the MEGA and the gas channel 29 on the anode side remains the same as in the foregoing embodiment, it is also permissible to apply the first modification to both the cathode-side gas channel 28 and the anode-side gas channel 29. Besides, the first modification may also be applied to only the anode-side gas channel 29.

Figure 13:
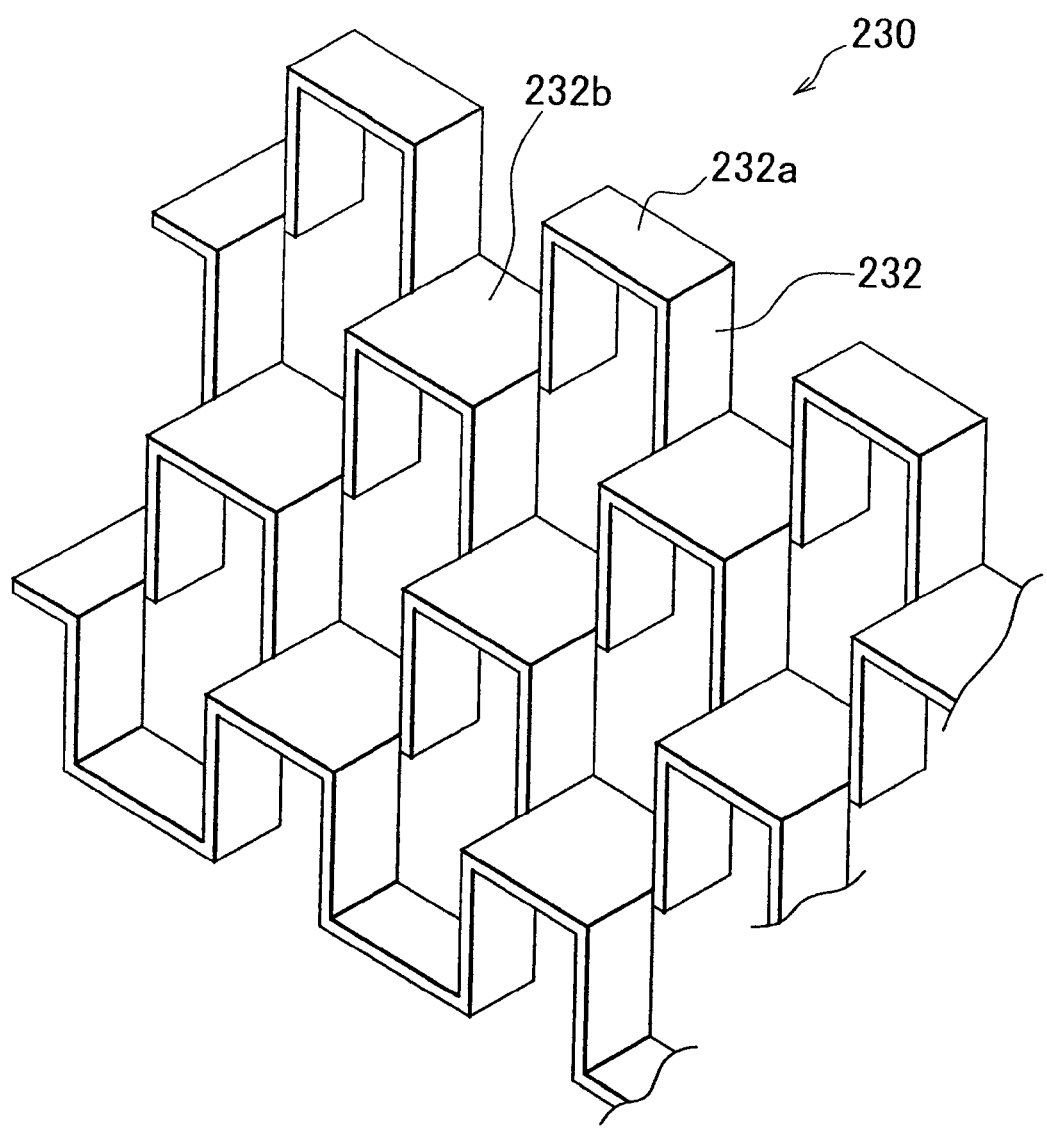
FIG. 13 is a perspective view showing a gas channel-forming member 230 provided in a fuel battery in accordance with a second modification of the embodiment.

Next, a second modification will be described. FIG. 13 is a perspective view of a gas channel-forming member 230 provided in a fuel battery in accordance with the second modification. Although in the foregoing embodiment, the penetration holes C formed between the connection planes S in the gas channel-forming member 30 have a hexagonal shape in an elevation view, the gas channel-forming member 230 in the second modification is constructed so that the penetration holes have a quadrangular shape in an elevation view as shown in FIG. 13. Specifically, each of corrugated plate portions 232 that form the gas channel-forming member 230 has continuous alternations between ridge portions 232a and trough portions 232b in which all the angled portions are of a right-angled shape. In this manner, the penetration holes of the gas channel-forming member 230 have a quadrangular shape.

According to the construction of the second modification, too, the reactant gas can be sufficiently fed in the perpendicular-to-plane direction of the electrode in addition to the planar direction of the electrode, and the diffusion efficiency of the reaction gas can be sufficiently heightened, as in the foregoing embodiment.

Next, a third modification will be described. Although in the foregoing embodiment, the gas channel-forming member 30 is a member produced by forming linear cuts in a zigzag pattern in a metal sheet and simultaneously expanding the cuts, the gas channel-forming member 30 may also be produced by preparing individual corrugated plate portions 32 as separate members and connecting the separate members by welding or the like.

Next, a fourth modification will be described. Although in the foregoing embodiment, the separator 40 is of a three-layer stacked type and therefore facilitates the formation of flat surfaces thereof, it is also permissible to provide a different platy member whose surfaces are flat. Besides, it is not altogether necessary that the separator 40 be limited to a separator whose surfaces are flat.

Next, a fifth modification will be described. Although in the foregoing embodiment, the cathode-side gas channel 28 and the anode-side gas channel 29 are constructed of the gas channel-forming members 30, 30' that are substantially the same except for the dimensions, it is also possible to adopt a construction in which only one of the gas channels 28, 29 is constructed of the gas channel-forming member 30. Specifically, in such a construction, only one of the gas channels 28, 29 is constructed of the gas channel-forming member 30, and the other gas channel is constructed of a different type of channel-forming member such as a structure incorporating a porous body, or the like.

A sixth modification will be described. Besides, the invention may also be applied to various types of fuel cells or batteries different from the foregoing embodiment and modifications. For example, the invention is also applicable to a direct methanol type fuel cell. The invention may also be applied to a fuel cell that has electrolyte layers that are made of a material other than the solid polymer.

The invention claimed is:

1. A fuel cell, comprising:
   an electrolyte layer,
   an electrode provided with a catalyst and formed on the electrolyte layer, and
   a gas channel-forming member that is disposed at a side of the electrode and that forms a channel for supplying a reactant gas to a plane of the electrode, wherein
   the gas channel-forming member is constructed so that a plurality of corrugated plate portions in each of which ridge portions and trough portions continuously alternate with each other in a first direction are interconnected in a second direction that intersects with the first direction and with a direction of an amplitude of the ridge portions and the trough portions, and so that two adjacent corrugated plate portions of the plurality of corrugated plate portions are interconnected in such a manner that the trough portions of one of the two corrugated plate portions connect to the ridge portions of another one of the corrugated plate portions and connection planes formed by interconnection between the trough portions and the ridge portions form stepped meshes, and wherein
   a planar direction of each of the corrugated plate portions is inclined by a predetermined angle with respect to the plane of the electrode.

2. The fuel cell according to claim 1, wherein the connection planes in the gas channel-forming member are inclined toward the electrode with respect to a flow direction of the reactant gas.

3. The fuel cell according to claim 1, wherein the connection planes in the gas channel-forming member are inclined away from the electrode with respect to a flow direction of the reactant gas.

4. The fuel cell according to claim 1, wherein the second direction is a direction perpendicular to the first direction and to the direction of the amplitude of the ridge portions and the trough portions.

5. The fuel cell according to claim 1, wherein lateral widths of the plurality of corrugated plate portions in the second direction are equal to each other.

6. The fuel cell according to claim 1, wherein the gas channel-forming member is disposed in such a direction that a direction of alignment of the connection planes is parallel to the plane of the electrode.

7. The fuel cell according to claim 1, wherein the meshes have a hexagonal shape in a view in the second direction.

8. The fuel cell according to claim 1, wherein the meshes have a quadrangular shape in a view in the second direction.

9. The fuel cell according to claim 1, wherein the gas channel-forming member is a member produced by forming cuts in a zigzag pattern in a metal sheet and expanding the cuts.

10. The fuel cell according to claim 1, further comprising a separator, wherein the gas channel-forming member is disposed between the electrode and the separator.

11. The fuel cell according to claim 10, wherein the separator is a three-layer stacked type separator formed by stacking three electroconductive plates that have electroconductivity.

* * * * *